UNITED STATES PATENT OFFICE.

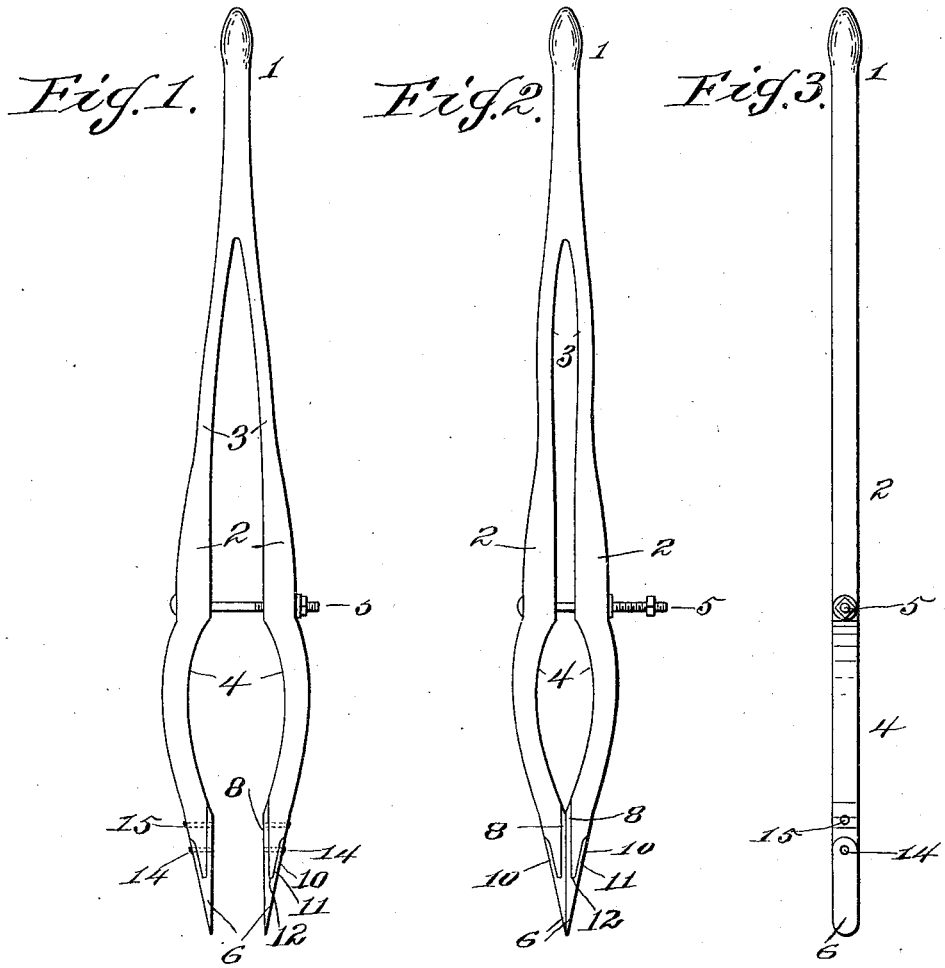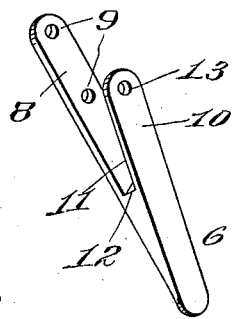

LLOYD C. DOUGHTY, OF ONLEY, VIRGINIA.

TRANSPLANTING IMPLEMENT.

938,651.  Specification of Letters Patent.  Patented Nov. 2, 1909.

Application filed May 26, 1909. Serial No. 498,440.

*To all whom it may concern:*

Be it known that I, LLOYD C. DOUGHTY, a citizen of the United States, residing at Onley, in the county of Accomac and State of Virginia, have invented certain new and useful Improvements in Transplanting Implements, of which the following is a specification.

This invention relates to hand planters, and more especially to a hand implement for planting or transplanting plants or sprouts.

The object of the invention is to provide an implement of novel and peculiar construction specially designed for transplanting plants and especially sweet potato sprouts.

A further object of the invention is to provide an implement of such novel and peculiar shape and design as will be capable of operation by hand while the operator is in standing position, so as to grasp the plant or sprout without injury thereto.

A further object of the invention is to provide a transplanting implement having spring-arms provided with specially designed points for making holes or places for transplanting, for entering the earth about the plants in transplanting, and for depositing the plants in such holes without injury thereto.

In the accompanying drawings forming part of this application: Figure 1 is a side elevation of the implement in position to grasp a plant. Fig. 2 is a similar view showing the implement in position for making holes or places for transplanting. Fig. 3 is an edge view. Fig. 4 is a detail perspective view of one of the piercing points.

The same reference numerals denote the same parts throughout the several views of the drawings.

The implement has a suitable handle-piece 1 from which are branched two arms or legs 2, of sufficient length to be operated without the necessity of the operator stooping or bending down. These arms or legs 2 are made with a spring portion 3, so that they may be compressed, and so that they will spring apart or retract of their own accord. Each arm is bowed or curved outwardly at 4, to prevent interference with the plant, and a pin or rod 5 extends through the arms adjacent the top of the bowed portions to limit the outward movement of the arms.

The lower end of each bowed portion 4 is provided with a piercing point 6. Both points being the same, only one will be herein described in detail; it is made or shaped similar to an arrow-head, its lower extremity is thin, pointed and flat, so that it may more readily enter the earth; from its inner face there is a flange extension 8, projecting from the top of the point flush with said face, and provided with apertures 9, a short flange 10 projects from the top of the point flush with the outer face of the point opposite the flange 8, so as to form a space 11 and a seat 12 for the lower end of the bowed portion, the flange 10 being provided with an aperture 13 for a rivet 14 which extends through said end and through one of the apertures 9 of the flange 8, and a rivet 15 extends through said end and through the other aperture 9. It is obvious that the bowed ends are made to fit the point seat, and that the outer side of said ends is recessed so as to let the flange 10 thereinto flush with the said end, and that the top end of the flange 8 is made thin so as to be practically flush with said bowed end, so that the flanges will not interfere in any way with the operation of the implement.

It will be seen that when the points are held in engagement with each other or sprung together, the implement may be used for making a plant hole, and that they may be permitted to spring apart gradually for varying the size of such hole according to the size or shape of the plant to be inserted therein. It will also be seen that the points, when in open position, may be pushed down over a plant to its roots without injuring it, or without the operator bending over or assuming a crouching position.

Although this implement is designed especially for transplanting sweet potato sprouts, it may be employed in transplanting cabbage and other sprouts.

Having thus described my invention what I claim as new and desire to secure by Letters Patent is:

In a transplanting implement for sweet potato sprouts, the combination, with a handle projecting from the implement, arms having a spring portion near their upper ends and increasing in size from the handle to an outwardly bowed portion adjacent the lower ends, and means to limit the outward movement of the arms, of a piercing point for the end of each arm and comprising a solid portion extending half the length of the points and terminating in thin flat ends, an arm seat at the top of said portion, a short outer flange projecting from the seat, a long inner flange projecting from the seat, and means for securing the flanges to the arm ends.

In witness whereof I hereunto set my hand in the presence of two witnesses.

LLOYD C. DOUGHTY.

Witnesses:
T. T. BLOXOM,
JNO. W. ROGERS.